(12) United States Patent
Leclercq

(10) Patent No.: US 8,350,725 B2
(45) Date of Patent: Jan. 8, 2013

(54) METHOD AND DEVICE FOR DETECTING ATTEMPTS AT INTRUDING ON A COMMUNICATION LINK BETWEEN AN AIRCRAFT AND A GROUND STATION

(75) Inventor: Agnes Leclercq, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 865 days.

(21) Appl. No.: 12/281,687

(22) PCT Filed: Feb. 28, 2007

(86) PCT No.: PCT/EP2007/001713
§ 371 (c)(1),
(2), (4) Date: Jun. 18, 2009

(87) PCT Pub. No.: WO2007/101588
PCT Pub. Date: Sep. 13, 2007

(65) Prior Publication Data
US 2009/0303083 A1 Dec. 10, 2009

(30) Foreign Application Priority Data
Mar. 8, 2006 (FR) ..................................... 06 02043

(51) Int. Cl.
*G08B 21/00* (2006.01)
(52) U.S. Cl. .............................. 340/945; 340/5.8; 726/23
(58) Field of Classification Search .................. 340/945, 340/5.8; 726/23
See application file for complete search history.

(56) References Cited

U.S. PATENT DOCUMENTS

| 5,448,760 | A | 9/1995 | Frederick |
| 6,157,825 | A | 12/2000 | Frederick |
| 7,660,986 | B1* | 2/2010 | Qiu et al. ...................... 713/166 |
| 7,827,411 | B2* | 11/2010 | Baier Saip et al. ........... 713/184 |
| 2001/0036273 | A1 | 11/2001 | Yoshizawa |
| 2003/0105979 | A1* | 6/2003 | Itoh et al. ...................... 713/201 |
| 2003/0139135 | A1* | 7/2003 | Rossi ............................ 455/3.04 |
| 2004/0153506 | A1* | 8/2004 | Ito et al. ........................ 709/204 |
| 2004/0153668 | A1* | 8/2004 | Baier Saip et al. ........... 713/201 |
| 2005/0037733 | A1 | 2/2005 | Coleman et al. |
| 2005/0081032 | A1* | 4/2005 | Struik ........................... 713/166 |

(Continued)

FOREIGN PATENT DOCUMENTS

EP 0 629 093 12/1994

(Continued)

OTHER PUBLICATIONS

U.S. Appl. No. 12/297,219, filed Oct. 15, 2008, Leclercq, et al.

(Continued)

*Primary Examiner* — Eric M Blount
(74) *Attorney, Agent, or Firm* — Oblon, Spivak, McClelland, Maier & Neustadt, L.L.P.

(57) ABSTRACT

The invention concerns a method and device for detecting attempts at intruding on a communication link between an aircraft and a ground station, the communication being capable of being configured according to multiple security levels, comprising the following steps: a) analyzing a message received to determine a security level corresponding to said message; b) comparing said security level with a security level associated with the communication; c) if the security levels compared at step b) are different, performing an action concerning the rejection of the received message and the signalling of an attempt at intrusion. The invention also concerns a device for implementing said method.

21 Claims, 1 Drawing Sheet

U.S. PATENT DOCUMENTS

2008/0025229 A1 * 1/2008 Beliles et al. ................ 370/245

FOREIGN PATENT DOCUMENTS

| EP | 1 150 531 | 10/2001 |
|----|-----------|---------|
| JP | H1-147926 | 6/1989 |
| JP | H5-336108 | 12/1993 |
| JP | 2004-220120 | 8/2004 |
| JP | 2005-229436 | 8/2005 |
| JP | 2005-527990 | 9/2005 |
| WO | 03/014891 A2 | 2/2003 |
| WO | 2005/043281 A2 | 5/2005 |

OTHER PUBLICATIONS

Office Action issued on Mar. 6, 2012 to Japanese Patent Application No. 2008-557633 (with English translation).

* cited by examiner

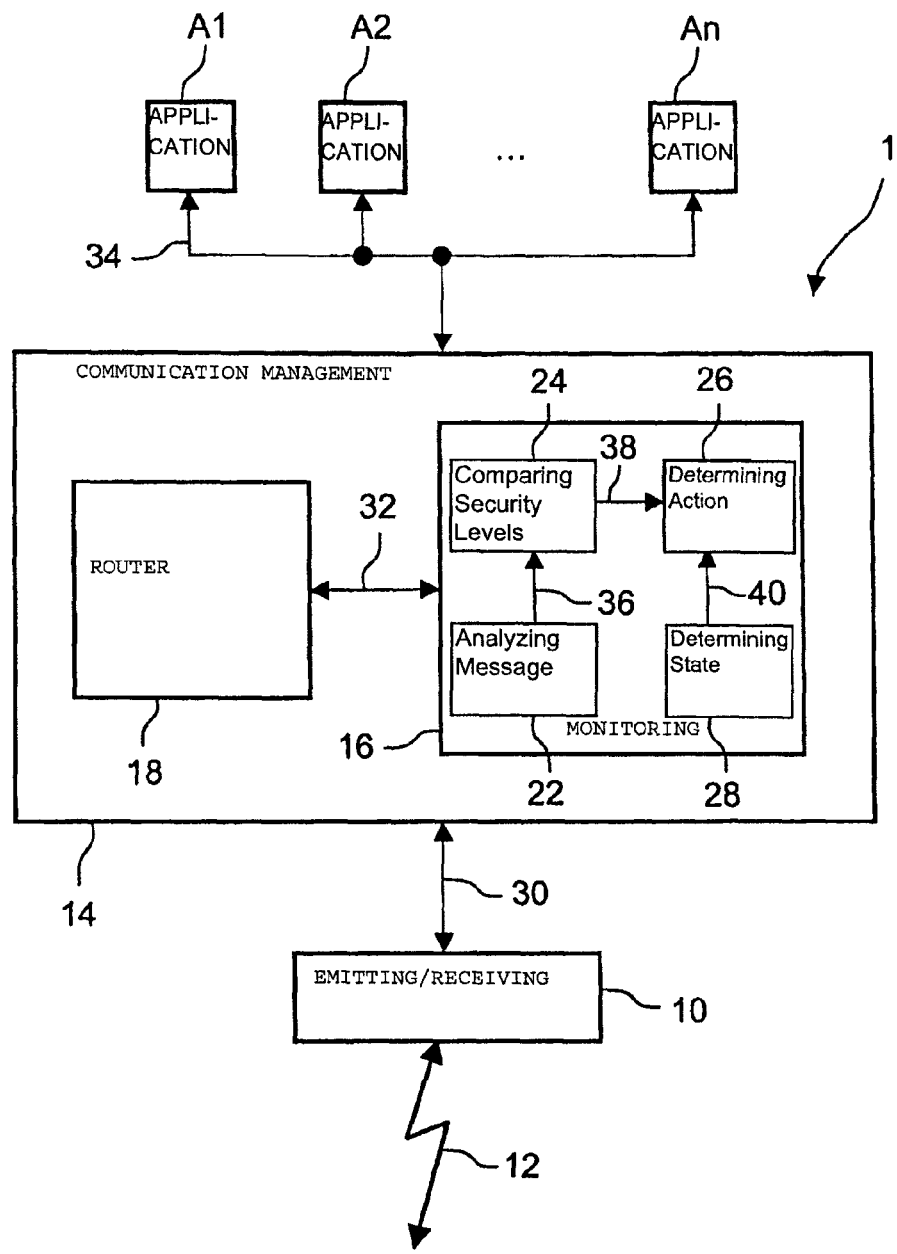

METHOD AND DEVICE FOR DETECTING ATTEMPTS AT INTRUDING ON A COMMUNICATION LINK BETWEEN AN AIRCRAFT AND A GROUND STATION

The object of the invention is a method for detecting attempts at intruding on a secure communication link between an aircraft and a ground station, as well as an aircraft provided with a device capable of implementing this method. The invention also relates to a device for detecting attempts at intruding on a secure communication link between an aircraft and a ground station, as well as to an aircraft provided with such a device.

Modern aircraft, particularly civil transportation airplanes, exchange information items with ground-based stations, especially air traffic control stations or stations making it possible to communicate with the airline companies operating these aircraft. The information items being exchanged may relate in particular to meteorology, to aircraft maintenance, to air traffic control authorizations, etc. This exchange of information items is generally achieved by means of digital data links ("datalink" in English), corresponding in particular to the standards ACARS ("Aircraft Communications Addressing and Reporting System" in English) or ATN ("Aeronautical Telecommunication Network" in English). After opening a communication session, an aircraft and a ground station exchange messages containing the said information items. The data links under consideration are generally of the radiocommunication or satellite type. Consequently, they can be intercepted by a pirate: he may attempt to decode messages transmitted by the aircraft or the ground station, but he may also send false messages that supposedly originated from an aircraft or a ground station. In order to protect the said communication links against acts of pirates, these links may be made secure: thus it is possible to provide for authentication of the emitter of a message and/or encryption of the messages. For example, that may be achieved by means of authentication and/or encryption keys. Nevertheless, a pirate may attempt to defeat these security techniques, particularly by sending a plurality of false messages until one among them is possibly accepted by an aircraft or a ground station. The risk that a false message will be accepted by an aircraft or a ground station decreases as the number of false messages becomes smaller. Consequently, in order to minimize this risk of acceptance of a message emitted by a pirate, it is important to detect the attempts at intruding on such a communication link, so that these attempts can be signaled to the aircraft pilot and/or to the personnel of the ground station (of the airline company or of air traffic control), who can then take appropriate vigilance measures.

According to the invention, these problems are solved at least partly by a method for detecting attempts at intruding on a communication link between an aircraft and a ground station. This method is noteworthy in that the communication is capable of being configured according to a plurality of security levels and in that it comprises the following steps:
  a) when a message is received by a receiving means associated with the said link, this message is analyzed to determine a security level corresponding to this message;
  b) the said security level corresponding to this received message is compared with a security level associated with the communication;
  c) if the security levels compared in step b) are different, an action relating to rejection of the received message and to signaling of an intrusion attempt is effected.

In this way, during the exchange of messages on a communication link on which a communication session has been established beforehand between an aircraft and a ground station, on the one hand received messages whose security level does not correspond to the expected security level are detected and, on the other hand, the said received messages are accepted or rejected and suspected intrusion attempts on the said link are signaled. The method according to the invention therefore has the advantages of permitting rejection of messages sent by a pirate and also of signaling the corresponding intrusion attempts, so that a human operator (pilot, air traffic control or airline company personnel, etc.) can take appropriate measures.

In a preferred embodiment, the said action, in step c), relating to rejection of the received message and to signaling of an intrusion attempt, is chosen in the following group:
  A1) the received message is rejected and an intrusion attempt is signaled; or
  A2) the received message is rejected; or
  A3) the received message is accepted.

Preferably, when the received message is rejected in step c), a message informing the emitter of the said received message that the latter has been rejected is sent on the said communication link. That has the advantage that, when this received message originates from an authorized emitter, but with an inappropriate security level, this emitter is informed of the rejection of the said message.

Advantageously, in step c), the value of a communication state associated with the said link is additionally verified and the said action relating to rejection of the received message and to signaling of an intrusion attempt is effected as a function of the said value of this communication state. This communication state may in particular correspond to a "stable" state or to a state "in the course of change" of the security level associated with the communication link. In this case, when this communication state corresponds to a "stable" state, the received message is rejected and an intrusion attempt is signaled. When this communication state corresponds to a state "in the course of change", the received message is rejected without any signaling of an intrusion attempt, since it is possible that this message had been emitted by the authorized emitter (aircraft or ground station) before this emitter took into account the change of the security level.

Also preferably, in step b), the security level associated with the communication corresponds to a security level preselected in the communication management means. In particular, this security level may be selected by a human operator (pilot, etc.) as a function of circumstances. This operator may in particular choose to raise the said security level if he is informed of an intrusion attempt by the method according to the invention. Generally, in order to change the security level of the communication link, these communication management means (of an aircraft or of a ground station) send a request intended for communication management means situated at another end of the said link (respectively a ground station or an aircraft) in order that these will select the same security level for this link.

In a preferred embodiment, if the security levels compared in step b) are different, there is sent, on the said communication link, a message asking the emitter of the said received message to change the security level of the communication, in order to raise it to the same security level as that preselected in the said communication management means. Thus that has the advantage that, when this received message originates from an authorized emitter, but with an inappropriate security level, it is possible automatically to resynchronize the security levels corresponding to the aircraft and to the ground station. The following messages can then be transmitted with the appropriate security level.

In a particular embodiment of the invention, the security level of the communication is a function of the type of message being transmitted. That makes it possible to adapt this security level to the importance and to the criticality of the messages, in order to send with a high security level (often having a higher sending cost than for a lower security level) only messages for which that is of importance.

Advantageously, when action A1) is undertaken in step c), a counter is additionally incremented. In this way it is possible to count the intrusion attempts on the said communication link. In particular, this counter may be consulted for maintenance or statistical purposes.

In another particular embodiment of the invention, when action A2) is undertaken in step c), a counter is additionally incremented and furthermore is reset to zero with a predetermined periodicity, and an intrusion attempt is signaled when the value of the said counter exceeds a predetermined threshold value. That makes it possible to detect the situations in which there are received, within a predetermined period, a sufficiently high number of messages whose security level is inappropriate but whose isolated reception would not have been considered an intrusion attempt.

Also preferably, in step c), action A1) or action A2) is undertaken depending on whether the value of the said communication state corresponds respectively to a stable security level or to a security level in the course of change. Thus, when there is received a message whose security level is not appropriate while the security level associated with the communication link is considered to be in a stable state, it is considered that an intrusion attempt has been made, since the emitter of the said message is assumed to have sent it with the appropriate security level. In contrast, when such a message is received while the security level associated with the communication link is considered to be in the course of change, it is considered that an intrusion attempt has not been made. In fact, in this case it is possible that the emitter of the message had not yet taken into account the change of security level associated with this link.

The invention also relates to a device for monitoring communication on a communication link between an aircraft and a ground station, provided with:
  means for emitting/receiving messages on this communication link;
  communication management means connected to the said emitting/receiving means.

This device is noteworthy in that, since the communication is capable of being configured according to a plurality of security levels, it is additionally provided with communication monitoring means comprising:
  first means capable of analyzing a message received by the said emitting/receiving means in order to determine a security level corresponding to this message;
  second means capable of comparing the said security level corresponding to this received message with a security level associated with the communication and of furnishing a comparison result;
  third means capable of determining an action associated with this received message as a function of the comparison result furnished by the second means.

Advantageously, the third means are additionally capable of verifying the value of a communication state associated with the said link and of determining the said action associated with the received message as a function of the value of this communication state.

Also advantageously, the said communication management means comprise the said communication monitoring means.

Also advantageously, the communication management means additionally comprise means capable of managing the value of the said communication state associated with the said link.

The said means for emitting/receiving messages are emitting/receiving means installed on board the said aircraft or in the said ground station, depending on whether it is desired to detect the intrusion attempts relating to the messages received by this aircraft or by this ground station. Preferably, the entire device according to the invention is installed respectively in this aircraft or in this ground station.

The invention also relates to an aircraft provided with a device for monitoring a communication between an aircraft and a ground station, as stated in the foregoing.

The invention will be better understood by reading the following description and by examining the attached FIGURE.

FIG. 1 is a block diagram of a device according to the invention for monitoring a communication between an aircraft and a ground station.

For the sake of clarity, the following description relates to an exemplary embodiment of the invention in the case in which it is desired to detect intrusion attempts relating to messages received by an aircraft. Of course, that must not be interpreted in limitative manner, the invention applying in similar manner to the detection of intrusion attempts relating to messages received by a ground station.

Device 1 according to the invention is represented schematically in FIG. 1. It is installed on board an aircraft, particularly a civil transportation airplane, communicating with a ground station by means of a communication link 12, in particular a digital data link ("datalink" in English) capable of being configured according to a plurality of security levels relative to the risks of intrusion by a pirate on this link.

This device is intended to monitor the communications on this link 12 in order to detect the intrusion attempts by a pirate on this link 12. For that purpose, device 1 according to the invention is provided with:
  means 10 for emitting/receiving messages on a communication link 12 between the said aircraft and the said ground station, for example, the usual communication means installed on board this aircraft (VHF, HF radio communication means, satellite communication means, etc.);
  communication management means 14 connected to these emitting/receiving means 10 via a link 30. These communication management means may in particular be part of a calculator that manages aircraft communications, for example a calculator of ATSU type ("Air Traffic Services Unit" in English);
  communication monitoring means 16, which comprise:
    first means 22 capable of analyzing a message received by emitting/receiving means 10 in order to determine a security level associated with this message;
    second means 24 capable of comparing this security level corresponding to this received message with a security level associated with the communication and of furnishing a comparison result;
    third means 26 capable of verifying the value of a communication state associated with link 12 and of determining an action associated with this received message as a function on the one hand of the comparison result furnished by second means 24 and on the other hand of the value of the said communication state.

Preferably, communication management means 14 are provided with a router 18 that receives, from emitting/receiving means 10, via link 30, the received messages of communication link 12 and that sends each message to at least one destination application A1, A2, . . . An via a set of links 34. Each of the said applications may in particular be a computerized application installed on a calculator of the aircraft. In reciprocal manner, this router collects messages originating from the said applications via the set of links 34 and transmits them via link 30 to emitting/receiving means 10, which sends them on communication link 12.

Also preferably, as represented in FIG. 1, communication monitoring means 16 are integrated in communication management means 14. They are connected to router 18 by a link 32.

Communication management means 14 additionally comprise means 28 capable of managing a communication state associated with communication link 12. These means 28 may in particular be integrated in communication monitoring means 16. These means 28 may correspond to a state machine that may in particular be provided with at least two states: a first state corresponding to a stable communication security level and a second state corresponding to a communication security level in the course of change. This second state corresponds in particular to a situation in which communication management means 14 of the aircraft have transmitted a request message intended for the ground station in order to change the security level of the communication (for example, following a request of the aircraft pilot) and in which the said communication management means 14 of the aircraft have not yet received acceptance from the ground station relating to this change of level. The first state in turn corresponds in particular to a situation in which communication management means 14 of the aircraft, after having transmitted a request message intended for the ground station in order to change the security level of the communication (for example, following a request from the aircraft pilot), have received acceptance from the ground station relating to this change of level. It also corresponds to a situation in which communication management means 14 of the aircraft have received from the ground station a request in order to change the security level of the communication and have transmitted a message of acceptance of the said request intended for the ground station.

When communication management means 14 are part of a calculator of ATSU type, communication monitoring means 16 integrated in the said communication management means 14, as well as first means 22, second means 24, third means 26 and means 28 capable of managing a communication state can be implemented in the form of software functions of the said ATSU calculator.

The security level of the communication may in particular be chosen within the set of following levels or within a subset of this set:
  absence of security of the communication with respect to risks of attack by a pirate;
  authentication of the emitter of a message, for example by using authentication keys;
  encryption of messages transmitted on data link 12, for example by using encryption keys;
  authentication of the emitter of a message and encryption of messages transmitted on data link 12.

In a preferred embodiment of the invention, the communication is capable of being configured according to:
  a first level corresponding to absence of security of the said communication with respect to risks of attack by a pirate;
  a second security level corresponding to authentication of the emitter of a message; or
  a third security level corresponding to authentication of the emitter of a message, as well as to encryption of messages transmitted on data link 12.

When emitting/receiving means 10 receive a message of communication link 12, they transmit it via link 30 to communication management means 14, where this message is received by router 18. The latter transmits it via link 32 to first means 22 integrated in communication monitoring means 16. These first means 22 analyze this message so as to determine the security level corresponding to this message. This security level is transmitted via a link 36 to second means 24. The said second means compare this security level with a security level associated with the communication, which level may in particular correspond to a security level preselected and stored in memory in communication means 14. In particular, this security level may be preselected following a request from the pilot or from the ground station with a view to changing this security level associated with the communication. The result of the comparison between the security level corresponding to the received message and the security level associated with the communication is transmitted by second means 24 via a link 38 to third means 26.

In the case in which the said compared security levels are identical, third means 26 send back to the router, via link 32, an information item for acceptance of the corresponding message, since in this case they have not detected an intrusion attempt on communication link 12. The router then transmits this message via the set of links 34 to the destination application.

In the case in which the said compared security levels are different, third means 26 send back to the router, via link 32, an information item for rejection of the corresponding message. Consequently, the router does not transmit this message to the destination application. Advantageously, communication management means 14 send a message to the ground station, by way of link 30, emitting/receiving means 10 and communication link 12, in order to inform this ground station about the rejection of the said message. These communication management means 14 also send to the ground station a message asking it to change the preselected security level in the said ground station in order to raise it to the same security level as that preselected in communication management means 14 of the aircraft. In this way, if the message received (and rejected) originated from the ground station, the latter can take appropriate measures to resend it with the appropriate security level. In addition, third means 26 verify the value of a communication state associated with communication link 12. Third means 26 receive this communication state from means 28 via a link 40. This communication state corresponds to one of the said at least first and second states mentioned above. In the case in which it corresponds to the first state (stable communication security level), it is considered that there is an intrusion attempt on communication link 12, since, prior to reception of the said message, the communication was established in stable manner with a security level corresponding to that associated with the communication. Consequently, third means 26 signal an intrusion attempt. This intrusion attempt may be signaled, for example, to an alarm management calculator (not illustrated in FIG. 1) of FWC type ("Flight Warning Computer" in English) in the aircraft or to a means of DCDU type ("Digital Communications Display Unit" in English) or MCDU type ("Multifunction Control Display Unit" in English) associated with communication link 12 and capable of displaying an information item relating to the said intrusion attempt. When the said communication state corresponds to the second state (communication security level in the course of change), it is not considered that there is an intrusion attempt on communication link 12, since, prior to reception of the said message, the communication security level was in the course of change: consequently, the received message may originate from the ground station, even if this is not certain. Third means 26 therefore do not signal an intrusion attempt in this case.

In a particular embodiment of the invention, when the said security levels compared by second means 24 are different, if the security level corresponding to the received message corresponds to the second level (authentication of the emitter of the message) and the security level associated with the communication corresponds to the third level (authentication of the emitter and encryption of the message), third means 26 send back to the router, via link 32, an information item for acceptance of the corresponding message. The router then transmits this message via the set of links 34 to the destination application. In fact, in this case it can be considered that there is no intrusion attempt on communication link 12, since the message is received with authentication of the emitter: if this corresponds well to the said ground station, it is deemed that the message does not originate from a pirate attempting an intrusion on communication link 12.

According to a first variant of the invention, the security level of the communication is common to all messages circulating on communication link 12 between the aircraft and this ground station.

According to another variant, when the messages circulating on the said communication link are of capable of being classified according to different message types, the security level of the communication is a function of the message type. This has the advantage that it makes it possible to adapt the security level to the importance and criticality of the messages. Thus it is possible to send, with a high security level (for example the said third level), only messages for which that is of importance. That makes it possible to reduce the costs of operation of the aircraft when the cost of transmission of a message increases as a function of the security level corresponding to this message. As an example, a first type of message known as ATC ("Air Traffic Control" in English) may correspond to messages exchanged between the aircraft and air traffic control, and a second type of message known as AOC ("Airline Operational Control" in English) may correspond to messages exchanged between the aircraft and the airline company that operates that aircraft.

Preferably, when third means 26 signal an intrusion attempt, they additionally activate the incrementation of a counter (not illustrated in FIG. 1) in communication monitoring means 16. This counter may in particular be read during the operations of maintenance of the aircraft, in order to be used for statistical purposes. In one particular embodiment, communication monitoring means 16 are provided with a plurality of counters and, during an intrusion attempt, one of the said counters is incremented, this counter being chosen as a function of the security level corresponding to the received message, of the security level of the communication and of the communication state associated with communication link 12. In the variant of the invention according to which the security level of the communication is a function of the message type, one counter can be associated with each message type. In this case, when third means 26 signal an intrusion attempt, the counter associated with the type of message corresponding to the received message is incremented.

In a particular embodiment of the invention, when third means 26 send back to router 18 an information item for rejection of the received message, without signaling an intrusion attempt, they additionally activate the incrementation of another counter (not illustrated in FIG. 1) in communication monitoring means 16. That corresponds in particular to the case in which the security level corresponding to the received message and the security level of the communication are different and in which the communication state corresponds to a security level in the course of change. This counter is reset to zero according to a regular periodicity, independently of the reception of messages. If it happens to exceed a predetermined value, third means 26 signal an intrusion attempt. In effect, although it is possible to consider that there is no intrusion attempt during reception of a limited number of messages whose security level is inappropriate during a change of security level of communication link 12, this is not the case when this number of messages is high, particularly when it is higher than the said predetermined value.

The invention claimed is:

1. A method for detecting attempts at intruding on a communication link between an aircraft and a ground station, the communication link having a plurality of security configurations, each configuration having a respective level of security, the method comprising the following steps:
  a) when a message is received by a receiving section associated with the communication link, analyzing the message to determine a security level corresponding to the message;
  b) comparing the security level corresponding to the received message with a security level associated with the communication link;
  b1) checking a communication state associated with the communication link to determine whether the level of security of the communication link is established in a stable manner; and
  c) if the security levels compared in step b) are different, and if the communication state determined in step b1) is not stable, effecting an action relating to rejection of the received message and signaling of an intrusion attempt.

2. The method according to claim 1, wherein said action relating to rejection of the received message and to signaling of an intrusion attempt is chosen from the following group:
  A1) the received message is rejected and the intrusion attempt is signaled;
  A2) the received message is rejected; or
  A3) the received message is accepted.

3. The method according to one of claims 1 or 2, wherein, when the received message is rejected in step c), a message informing the emitter of the received message that the received message has been rejected is sent on the communication link.

4. The method according to claim 2, wherein, in step c), a value of a communication state associated with the link is additionally verified and the effecting the action relating to rejection of the received message and to signaling of the intrusion attempt is effected as a function of the value of the communication state.

5. The method according to claim 1, wherein, in step b), the security level associated with the communication link corresponds to a security level preselected in a communication management section.

6. The method according to claim 5, further comprising, if the security levels compared in step b) are different, sending, on the communication link, a message asking the emitter of the received message to change the security level of the message in order to raise the security level to a same security level as the security level preselected in the communication management section.

7. The method according to claim 1, wherein the security level of the message is a function of a type of the message.

8. The method according to claim 2, further comprising: incrementing a counter when action A1) is undertaken in step c).

9. The method according to claim 2, further comprising: incrementing a counter when action A2) is undertaken in step c), and resetting the counter to zero with a predetermined periodicity, an intrusion attempt being signaled when a value of the counter exceeds a predetermined threshold value.

10. The method according to claim 2, wherein the communication link is capable of being configured according to:
a first level corresponding to an absence of security of the communication link with respect to risks of attack by a pirate;
a second security level corresponding to authentication of the emitter of a message; and
a third security level corresponding to authentication of the emitter of a message, as well as encryption of messages transmitted on the communication link.

11. The method according to claim 10, further comprising: undertaking action A3) when the security level of the received message corresponds to the second level and the security level associated with the communication link corresponds to the third level.

12. The method according to claim 4, further comprising: undertaking action A1) or action A2) depending on whether the value of the communication state corresponds respectively to a stable security level or to a security level in a course of change.

13. A device for monitoring communication on a communication link between an aircraft and a ground station, the communication link having a plurality of security configurations each having a respective level of security, the device comprising:
a transceiver that transmits and receives messages on the communication link;
a communication management section connected to the transceiver;
a communication monitoring section including
an analyzing section that analyzes a message received by the transceiver to determine a security level corresponding to the message;
a comparing section that compares the security level corresponding to the received message with a security level associated with the communication link and furnishes a comparison result;
a state checking section that checks a communication state associated with the communication link to determine whether the level of security of the communication link is established in a stable manner; and
a determining section that determines an action associated with the received message as a function of the comparison result furnished by the comparing section and the communication state determined by the state checking section.

14. The device according to claim 13, wherein the determining section is further configured to verify a value of the communication state associated with the communication link and determine the action associated with the received message as a function of the value of the communication state.

15. The device according to claim 13, wherein the communication management section includes the communication monitoring section.

16. The device according to claim 14, wherein the communication management section is further configured to manage the value of the communication state associated with the communication link.

17. The device according to claim 13, wherein the transceiver is installed on board the aircraft.

18. The device according to claim 13, wherein the transceiver is installed in the ground station.

19. An aircraft having a communication monitoring section comprising:
an analyzing section that analyzes a message received by a transceiver to determine a security level corresponding to the message;
a comparing section that compares the security level corresponding to the received message with a security level associated with a communication link to a ground station and furnishes a comparison result;
a state checking section that checks a communication state associated with the communication link to determine whether the security level associated with the communication link is established in a stable manner; and
a determining section that determines an action associated with the received message as a function of the comparison result furnished by the comparing section and the communication state determined by the state checking section.

20. The method according to claim 1, wherein, if the security levels compared in step b) are different and the communication state determined in step b1) indicates the security level associated with the communication link is in the course of change, the signaling of the intrusion attempt is not effected.

21. The device according to claim 13, wherein, if the security levels compared by the comparing section are different and the communication state determined by the state checking section indicates the security level associated with the communication link is in the course of change, signaling of an intrusion attempt is not effected.

* * * * *